INVENTOR.
Robert V. Mathers
BY
Harness, Dickey & Pierce
ATTORNEYS.

United States Patent Office 3,469,660
Patented Sept. 30, 1969

3,469,660
DOUBLE ACTING S-CAM FOR WHEEL BRAKES
Robert V. Mathers, Grosse Pointe Farms, Mich., assignor to Fruehauf Corporation, Detroit, Mich., a corporation of Michigan
Filed Dec. 28, 1967, Ser. No. 694,192
Int. Cl. F16d 65/22; F16h 53/00
U.S. Cl. 188—78      5 Claims

ABSTRACT OF THE DISCLOSURE

The two halves of brake shoes have a pair of adjacent ends disposed in pivotal relation within a brake drum with an S-cam engaging rollers at the other ends which expands the diameter of the bands when the S-cam is angularly adjusted. To obtain a greater length of expansion while maintaining substantially the same applied force, a double acting S-cam on the same diameter cam body engages rollers having portions of different diameters. One S-cam section engages the roller portions of smaller diameter to initially spread them apart before the other S-cam section engages the roller portions of larger diameter to increase their separation and produce pressure on the brake drum surface.

Background of the invention

The invention relates to a brake band operating S-cam engageable with rollers at the ends thereof somewhat similar to that illustrated in the L. R. Lyon Patent No. 3,275,103.

Summary of the invention

A plate fixed on the wheel axle has arcuate brake shoes pivoted thereon at one end in position to have the opposite end expanded against the surface of a brake drum. The opposite ends support rollers which are engaged by an S-cam which, when actuated, moves the rollers and the adjacent ends of the arcuate brake shoes away from each other to thereby expand the bands into engagement with the braking surface of the drum. The present improvement pertains to the roller and cam arrangement which produces a greater degree of expansion to the ends of the brake shoes for the same diameter of S-cam body without any substantial increase in the applied force. To this end the rollers are constructed to have roller portions of small diameter and a roller portion of larger diameter. The double acting S-cam is so constructed as to have one S-cam section engage the small roller portions for initially moving the rollers away from each other. Thereafter, the other S-cam section engages the roller portions of larger diameter to continue the movement thereof away from each other with substantially the same amount of applied force.

Description of the preferred embodiment

Figure 1:
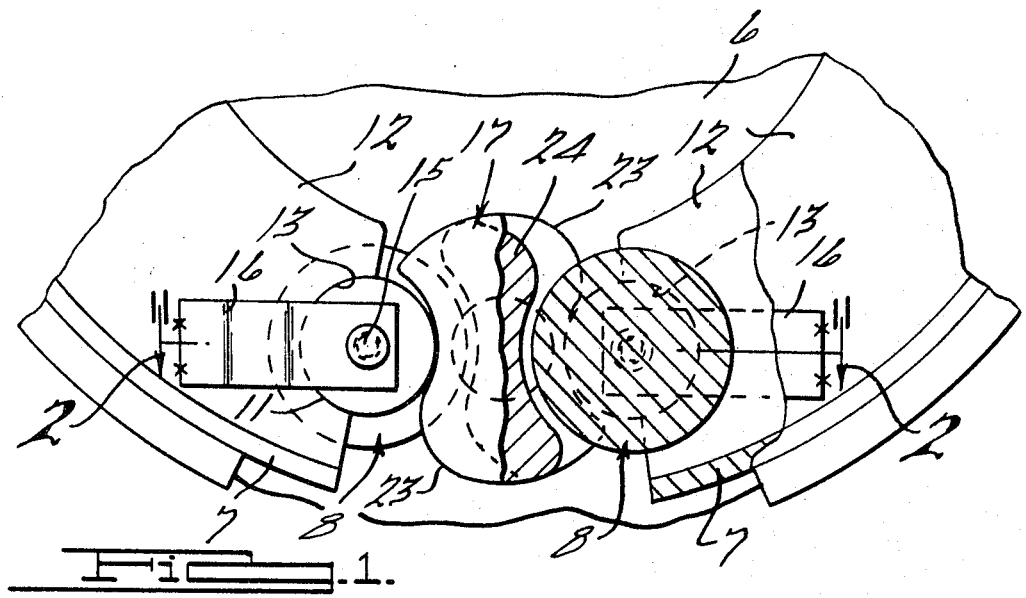
FIGURE 1 is a broken view in elevation with parts in section, showing the brake shoes with adjacent rollers engaged by a double acting S-cam.
Figure 2:
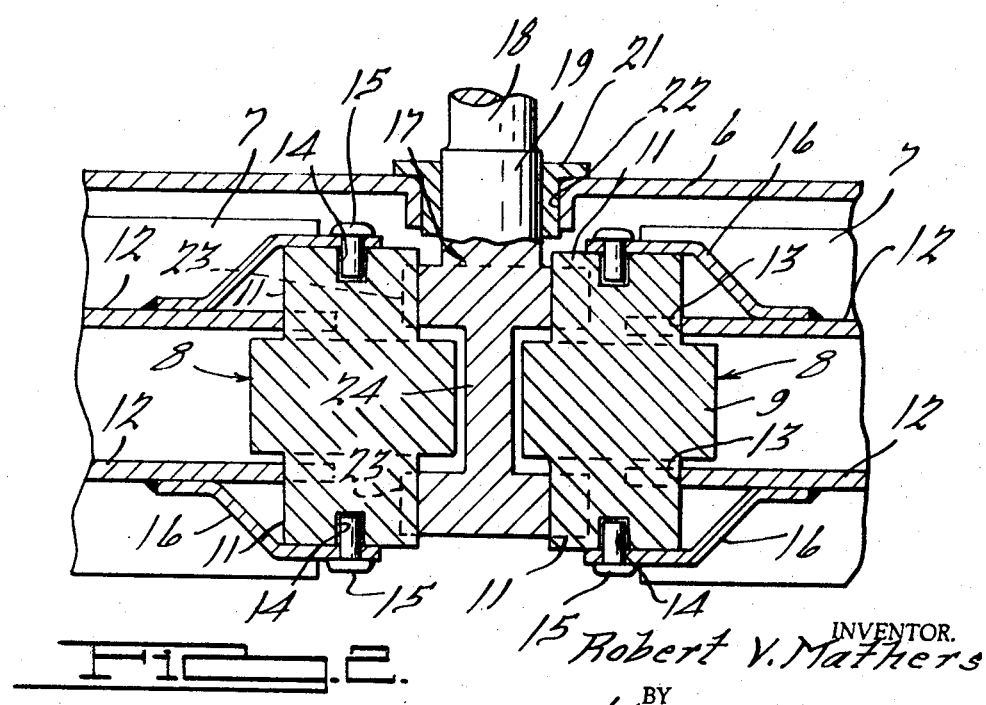
FIG. 2 is a section view of the structure illustrated in FIG. 1, taken on the line 2—2 thereof.

A supporting plate 6 is secured to the wheel axle against rotation. The plate carries a pair of arcuate brake shoes 7 having one set of adjacent ends pivoted to the plate. The ends which are to be moved apart to apply the brake shoes to the surface of the brake drum carry rollers 8 which have a central portion 9 of greater diameter than the end portions 11. The arcuate brake shoes 7 have outwardly extending ribs 12, the facing ends of which contain an arcuate recess 13 which snugly receives the arcuate surface of the end portions 11 of the rollers 8. These portions have central apertures 14 which receive the body of rivets 15 secured to fingers 16 which are welded or otherwise attached to the ribs 12. This retains the rollers within the arcuate section 13 in position to be engaged by a double acting S-cam 17. It is to be understood that other means of retaining the rollers may be employed without affecting the concept of the invention.

An operating end 18 of the cam has a cylindrical section 19 which is journalled in a sleeve bearing 21 mounted in a flanged aperture 22 in the fixed plate 6. S-shaped outer sections 23 of the double acting S-cam 17 engage the roller portions 11 of smaller diameter and an S-shaped central section 24 engages the central roller portions 9 of greater diameter. It will be noted that the width of the two portions 23 are the same and that each portion is less than the width of the central portion 24. This provides substantially the same length of line engagement on the roller portions of small diameter as that on the portion of larger diameter.

When the end cam sections 23 move the roller portion 11 outwardly to substantially its maximum amount, the central cam section 24 will have moved into engagement with the surface of the roller portion 9 and continue the outward movement of the rollers and the separation of the ends of the brake shoes 7 to produce a maximum brake surface pressure with a substantially uniform force.

What is claimed is:
1. In an expansible mechanism for brake shoe means having spaced adjacent ends, a central roller on the adjacent ends having roller portions of smaller diameter at the ends thereof, an S-cam having a thin central section and a thick section having portions located outwardly thereof, said thin and thick sections being disposed between said rollers, adjacent thick sections being aligned with the roller portions of small diameter, the thin section being aligned with the central roller of large diameter.

2. In an expansible mechanism for brake shoe means having spaced adjacent ends as recited in claim 1, wherein the smaller diameter roller portions engage arcuate ends on flanges of the brake shoes.

3. In an expansible mechanism for brake shoe means having spaced adjacent ends as recited in claim 2, wherein the brake shoes are mounted within a brake drum which is engaged thereby when the rollers are moved away from each other by the different sections of the S-cam.

4. In an expanding mechanism for brake shoe means having spaced adjacent ends as recited in claim 3, wherein the initial outward movement of the rollers is produced by the thick sections of the S-cam in engagement with the roller portions of smaller diameter when the S-cam is initially rotated and a further outward movement thereof is produced by the thin section of the S-cam engaging the central roller of greater diameter when the S-cam is further rotated.

5. In an expanding mechanism for brake shoe means having spaced adjacent ends as recited in claim 4, wherein the thin and thick section of the S-cam have substantially the same overall length.

References Cited

UNITED STATES PATENTS

| | | | |
|---|---|---|---|
| 651,828 | 6/1900 | Copland | 74—568 X |
| 2,775,316 | 12/1956 | Scheel | 74—567 X |
| 3,114,437 | 12/1963 | House. | |
| 3,196,987 | 7/1965 | Moore et al. | |

MILTON BUCHLER, Primary Examiner

THOMAS W. BUCKMAN, Assistant Examiner

U.S. Cl. X.R.

74—107, 567